(12) United States Patent
Yavuz et al.

(10) Patent No.: US 8,711,786 B2
(45) Date of Patent: Apr. 29, 2014

(54) AUTONOMOUS DOWNLINK CODE SELECTION FOR FEMTO CELLS

(75) Inventors: Mehmet Yavuz, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 12/463,701

(22) Filed: May 11, 2009

(65) Prior Publication Data

US 2010/0118801 A1    May 13, 2010

Related U.S. Application Data

(60) Provisional application No. 61/052,911, filed on May 13, 2008, provisional application No. 61/077,534, filed on Jul. 2, 2008.

(51) Int. Cl.
*H04W 72/12* (2009.01)
*H04W 84/04* (2009.01)

(52) U.S. Cl.
CPC ................................. *H04W 84/045* (2013.01)
USPC ........................................................ 370/329

(58) Field of Classification Search
CPC .................................................. H04W 84/045
USPC .......... 370/241, 252, 310, 328, 329, 331, 338; 455/403, 410, 422.1, 423, 424, 436, 455/444, 446
See application file for complete search history.

(56) References Cited

U.S. PATENT DOCUMENTS

| 5,396,516 A | 3/1995 | Padovani et al. |
| 5,606,727 A | 2/1997 | Ueda |
| 5,832,378 A * | 11/1998 | Zicker et al. ............... 455/552.1 |
| 5,839,063 A | 11/1998 | Lee |

(Continued)

FOREIGN PATENT DOCUMENTS

| CN | 1497888 A | 5/2004 |
| CN | 1513275 A | 7/2004 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8); 3GPP TS 36.304 V8.1 .0" 3rd Generation Partnership Project (3GPP), Mar. 1, 2008.

(Continued)

*Primary Examiner* — Chi Pham
*Assistant Examiner* — Robert Lopata

(57) ABSTRACT

Downlink codes may be chosen autonomously for femtocells in a wireless communication environment. Downlink transmissions are received from Home NodeBs that are neighbors of the femtocell and macrocell base stations near the femtocell. The downlink transmissions are evaluated to recognize a first set of detected downlink codes that each have a pilot energy above a predetermined detection threshold. An optimal downlink code is selected for use in connection with serving user equipment of the femtocell. The optimal downlink code is based upon the first set of detected downlink codes and selected as a downlink code from a set of downlink codes reserved for the femtocell. The optimal downlink code may be an available downlink code with a smallest amount of detected energy or a randomly selected downlink code from the available downlink codes.

25 Claims, 10 Drawing Sheets

(56) References Cited

U.S. PATENT DOCUMENTS

| | | | |
|---|---|---|---|
| 5,884,145 A * | 3/1999 | Haartsen | 455/63.2 |
| 6,223,031 B1 * | 4/2001 | Naslund | 455/423 |
| 6,643,520 B1 | 11/2003 | Park et al. | |
| 7,512,379 B2 | 3/2009 | Nguyen | |
| 7,536,626 B2 | 5/2009 | Sutivong et al. | |
| 2002/0160798 A1 | 10/2002 | Shoji et al. | |
| 2003/0161268 A1 | 8/2003 | Larsson et al. | |
| 2004/0127191 A1 | 7/2004 | Matsunaga | |
| 2004/0132410 A1 | 7/2004 | Hundal et al. | |
| 2005/0148368 A1 | 7/2005 | Scheinert et al. | |
| 2006/0089141 A1 | 4/2006 | Ho et al. | |
| 2006/0099987 A1 | 5/2006 | Singh et al. | |
| 2006/0183481 A1 | 8/2006 | Furukawa et al. | |
| 2006/0209764 A1 | 9/2006 | Kim et al. | |
| 2007/0047493 A1 | 3/2007 | Park et al. | |
| 2007/0047494 A1 | 3/2007 | Cordone | |
| 2007/0097939 A1 * | 5/2007 | Nylander et al. | 370/338 |
| 2007/0105574 A1 | 5/2007 | Gupta et al. | |
| 2007/0238448 A1 | 10/2007 | Gallagher et al. | |
| 2008/0057934 A1 | 3/2008 | Sung et al. | |
| 2008/0076425 A1 | 3/2008 | Khetawat et al. | |
| 2008/0102877 A1 | 5/2008 | Suemitsu et al. | |
| 2009/0042595 A1 * | 2/2009 | Yavuz et al. | 455/522 |
| 2009/0042596 A1 | 2/2009 | Yavuz et al. | |
| 2009/0052395 A1 * | 2/2009 | Bao et al. | 370/331 |
| 2009/0061873 A1 | 3/2009 | Bao et al. | |
| 2009/0111499 A1 * | 4/2009 | Bosch et al. | 455/522 |
| 2009/0135790 A1 | 5/2009 | Yavuz et al. | |
| 2009/0252088 A1 * | 10/2009 | Rao et al. | 370/328 |
| 2009/0258644 A1 | 10/2009 | Osborn | |
| 2009/0280819 A1 * | 11/2009 | Brisebois et al. | 455/446 |
| 2009/0285113 A1 | 11/2009 | Yavuz et al. | |
| 2009/0285172 A1 | 11/2009 | Hansen et al. | |
| 2009/0286496 A1 | 11/2009 | Yavuz et al. | |
| 2009/0286545 A1 | 11/2009 | Yavuz et al. | |
| 2010/0151870 A1 | 6/2010 | Piercy et al. | |
| 2010/0323663 A1 * | 12/2010 | Vikberg et al. | 455/410 |
| 2011/0003597 A1 | 1/2011 | Budic et al. | |
| 2011/0021240 A1 | 1/2011 | Hiltunen et al. | |
| 2011/0028170 A1 | 2/2011 | Sawai | |
| 2011/0028179 A1 | 2/2011 | Sawai et al. | |
| 2011/0110254 A1 | 5/2011 | Ji et al. | |

FOREIGN PATENT DOCUMENTS

| | | |
|---|---|---|
| CN | 1894979 A | 1/2007 |
| CN | 101052193 A | 10/2007 |
| CN | 101128994 A | 2/2008 |
| EP | 1638247 A1 | 3/2006 |
| EP | 1806651 A2 | 7/2007 |
| EP | 1806851 A2 | 7/2007 |
| EP | 1843618 | 10/2007 |
| GB | 2266433 A | 10/1993 |
| JP | 2001238252 A | 8/2001 |
| JP | 2001513970 A | 9/2001 |
| JP | 2002536905 A | 10/2002 |
| JP | 2004207839 A | 7/2004 |
| JP | 2007266785 A | 10/2007 |
| JP | 2007529915 A | 10/2007 |
| JP | 2008061250 A | 3/2008 |
| JP | 2008098869 A | 4/2008 |
| RU | 2114508 C1 | 6/1998 |
| RU | 2168871 C2 | 6/2001 |
| RU | 2232484 C2 | 7/2004 |
| RU | 2304853 C2 | 8/2007 |
| TW | 200812352 A | 3/2008 |
| WO | 0008706 A2 | 2/2000 |
| WO | WO-0046929 A1 | 8/2000 |
| WO | 2005015917 A2 | 2/2005 |
| WO | WO2006007318 A1 | 1/2006 |
| WO | WO2006010958 A2 | 2/2006 |
| WO | WO2006079689 A1 | 8/2006 |
| WO | WO2006091172 A1 | 8/2006 |
| WO | WO2006117838 A1 | 11/2006 |
| WO | WO2007024895 A2 | 3/2007 |
| WO | WO2007040449 A1 | 4/2007 |
| WO | WO2008025874 A1 | 3/2008 |
| WO | WO2009039404 | 3/2009 |

OTHER PUBLICATIONS

"3rd Generation Partnership Project; Technical Specification Group Radio Access Networks; 3G Home NodeB Study Item Technical Report (Release 8); 3GPP TR 25.820 V8.0.0"3rd Generation Partnership Project (3GPP), Mar. 1, 2008, pp. 1-37.

Claussen H et al: "An overview of the femtocell concept" Bell Labs Technical Journal, Wiley, CA, US, vol. 1, No. 13, Mar. 21, 2008, pp. 221-245, XP001512256 ISSN: 1089-7089 abstract p. 224, left-hand column-p. 225, left-hand column-p. 227, paragraphs Auto-Configuration,Downlink,Uplink figure 2.

International Search Report and Written Opinion—PCT/US2009/043673, International Search Authority—European Patent Office—Sep. 23, 2009.

Patrick Agyapong et al: "Interference Tolerance Signaling Using TDD Busy Tone Concept" Vehicular Technology Conference, 2007. VTC2007—Spring. IEEE 65th, IEEE, PI, Apr. 1, 2007, pp. 2850-2854, XP031093151. ISBN: 978-1-4244-0266-3.

Vikram Chandrasekhar et al: "Uplink Capacity and Interference Avoidance for Two-Tier Cellular Networks" Global Telecommunications Conference, 2007. GLOBECOM '07. IEEE, Piscataway, NJ, USA, Nov. 1, 2007, pp. 3322-3326, XP031196558.

Taiwan Search Report—TW098115891—TIPO—Jul. 26, 2010.

Ericsson, "Home Node B output power", R4-070969, 3GPP TSG-RAN Working Group 4 (Radio) meeting #43bis Orlando, USA, Jun. 25-29, 2007.

Fan et al., "Interference Management in Femto Cell Deployment", 3GPP2, S00-FEMTO-20071015-025_QCOM Femto Interference Management, Oct. 15, 2007.

* cited by examiner

US 8,711,786 B2

AUTONOMOUS DOWNLINK CODE SELECTION FOR FEMTO CELLS

CLAIM OF PRIORITY UNDER 35 U.S.C. §119

This application claims the benefit of and priority to commonly owned U.S. Provisional Patent Application No. 61/052,911, filed May 13, 2008, and U.S. Provisional Patent Application No. 61/077,534, filed Jul. 2, 2008, the disclosure of each of which is hereby incorporated by reference herein.

REFERENCE TO CO-PENDING APPLICATIONS FOR PATENT

This application is related to concurrently filed and commonly owned: U.S. patent application Ser. No. 12/463,395, entitled "Autonomous Carrier Selection for Femto Cells," and assigned; and U.S. patent application Ser. No. 12/463,705, entitled "Transmit Power Selection for User Equipment Communicating with Femto Cells," the disclosures of each which is hereby incorporated by reference herein.

BACKGROUND

1. Field

This application relates generally to wireless communication and more specifically, but not exclusively, to improving communication performance.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs, or femto cells and may be used to provide more robust indoor wireless coverage to mobile units. Typically, such small-coverage base stations are connected to the Internet and the mobile operator's network via a Digital Subscriber Line (DSL) router or a cable modem.

In a typical macro cellular deployment the RF coverage is planned and managed by cellular network operators to optimize coverage between macro base stations. Femto base stations, on the other hand, may be installed by the subscriber personally and deployed in an ad-hoc manner. Consequently, femto cells may cause interference both on the uplink (UL) and downlink (DL) of the macro cells. For example, a femto base station installed near a window of a residence may cause significant downlink interference to any access terminals outside the house that are not served by the femto cell. Also, on the uplink, home access terminals that are served by a femto cell may cause interference at a macro cell base station (e.g., macro NodeB).

Femto cells also may interfere with one another and macrocells as a result of unplanned deployment. For example, in a multi-resident apartment, a femto base station installed near a wall separating two residences may cause significant interference to a femto base station in a neighboring residence. Here, the strongest femto base station seen by a home access terminal (e.g., strongest in terms of RF signal strength received at the access terminal) may not necessarily be the serving base station for the access terminal due to a restricted association policy enforced by that femto base station.

Thus, interference issues may arise in a communication system where radio frequency (RF) coverage of femto base stations is not optimized by the mobile operator and where deployment of such base stations is ad-hoc. Consequently, there is a need for improved interference management for wireless networks.

Figure 1:
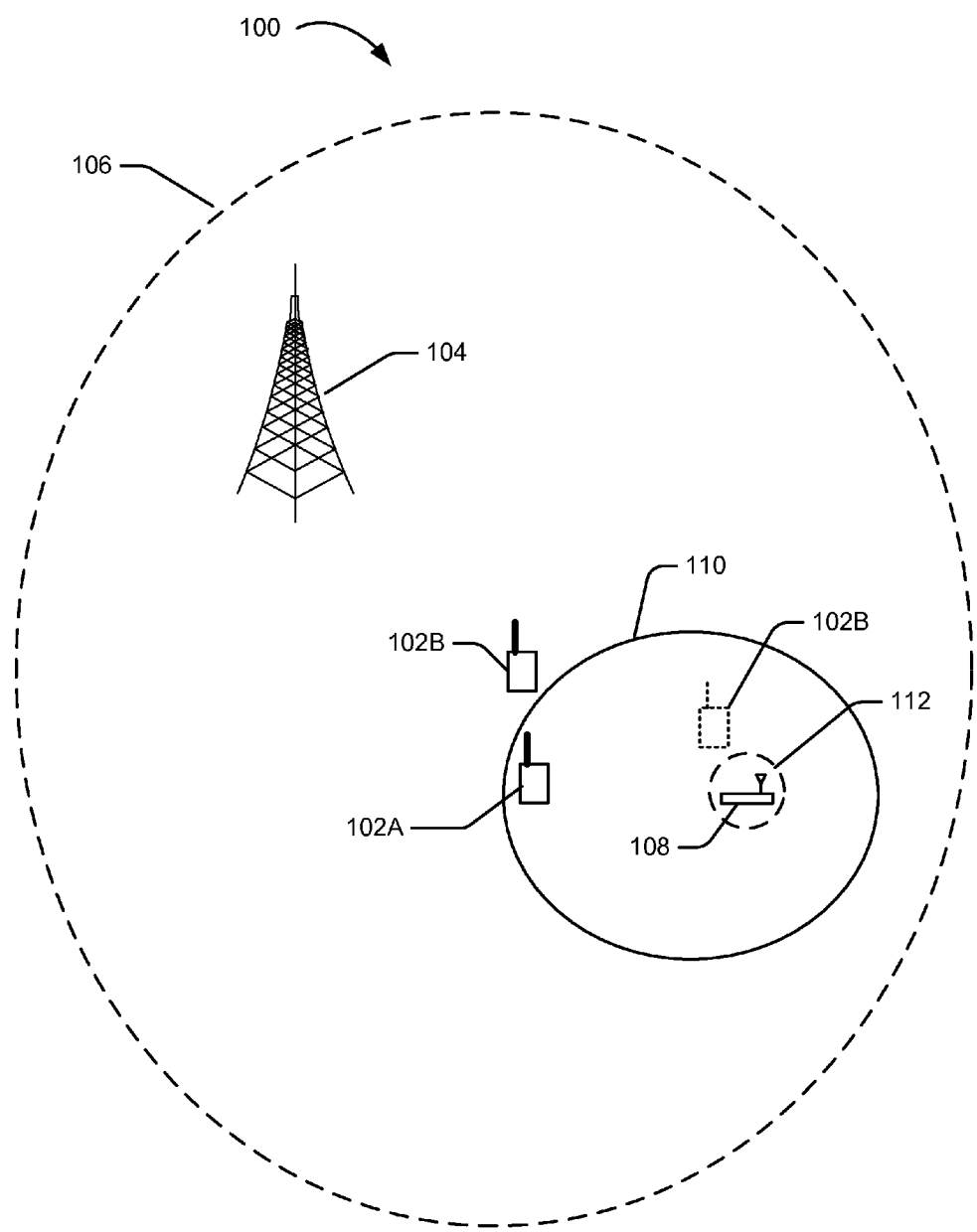
FIG. 1 is a simplified diagram of several sample aspects of a communication system including macro coverage and smaller scale coverage.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Various embodiments of the disclosure are described below. It should be apparent that the teachings herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented, or a method may be practiced, using any number of the embodiments set forth herein. In addition, such an apparatus may be implemented, or such a method may be practiced, using other structure, functionality, or structure and functionality in addition to or other than one or more of the embodiments set forth herein.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, High-Speed Downlink Packet Access (HSDPA) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA.

Although certain embodiments of the disclosure may be described using 3GPP terminology, it is to be understood that the teachings herein may be applied to 3GPP (Re199, Re15, Re16, Re17) technology, as well as 3GPP2 (1xRTT, 1xEV-DO Rel0, RevA, RevB) technology and other technologies.

FIG. 1 illustrates a network system 100 that includes macro scale coverage (e.g., a large area cellular network such as a 3G network, which may be commonly referred to as a macro cell network) and smaller scale coverage (e.g., a residence-based or building-based network environment). As a node such as access terminal 102A moves through the network, the access terminal 102A may be served in certain locations by macro access nodes 104 (also referred to herein as macro nodes) that provide macro coverage as represented by a macro coverage area 106 while the access terminal 102A may be served at other locations by small scale access nodes 108 (also referred to herein as small scale nodes) that provide smaller scale coverage as represented by the small scale coverage area 110. In some aspects, the small scale nodes 108 may be used to provide incremental capacity growth, in-building coverage, and different services (e.g., for a more robust user experience).

As will be discussed in more detail below, the small scale access node 108 may be restricted in that it may not provide certain services to certain nodes (e.g., an indoor access terminal 102B). As a result, a coverage hole may be created in the macro coverage area 106.

The size of the coverage hole may depend on whether the macro access node 104 and the small scale node 108 are operating on the same frequency carrier. For example, when the nodes 104 and 108 are on a co-channel (e.g., using the same frequency carrier), the coverage hole may correspond closely to the small scale coverage area 110. Thus, in this case the access terminal 102A may lose macro coverage when it is within the small scale coverage area 110 (e.g., as indicated by the phantom view of the access terminal 102B).

A small scale node 108 may be, for example, a femto node or a pico node. A femto node may be an access node that has a limited coverage area, such as for example a home or apartment. A node that provides coverage over an area that is smaller than a macro area and larger than a femto area may be referred to as a pico node (e.g., providing coverage within a commercial building). It should be appreciated that the teachings herein may be implemented with various types of nodes and systems. For example, a pico node or some other type of node may provide the same or similar functionality as a femto node for a different (e.g., larger) coverage area. Thus, as discussed more fully below, like a femto node, a pico node may be restricted, a pico node may be associated with one or more home access terminals, and so on.

When the nodes 104 and 108 are on adjacent channels (e.g., using different frequency carriers), a smaller coverage hole 112 may be created in the macro coverage area 104 as a result of adjacent channel interference from the small scale node 108. Thus, when the access terminal 102A is operating on an adjacent channel, the access terminal 102A may receive macro coverage at a location that is closer to the small scale node 108 (e.g., just outside the smaller coverage hole 112).

Depending on system design parameters, the co-channel coverage hole may be relatively large. For example, when the transmit power of the small scale node 108 is 0 dBm, the radius for which the interference of the small scale node 108 is at least the same as the thermal noise floor may be on the order of 40 meters, assuming free space propagation loss and a worst case where there is no wall separation between the small scale node 108 and access terminal 102B.

A tradeoff thus exists between minimizing the outage in the macro coverage area 106 while maintaining adequate coverage within a designated smaller scale environment (e.g., femto node 108 coverage inside a home). For example, when a restricted femto node 108 is at the edge of the macro coverage area 106, as a visiting access terminal approaches the femto node 108, the visiting access terminal is likely to lose macro coverage and drop the call. In such a case, one solution for the macro cellular network would be to move the visitor access terminal to another carrier (e.g., where the adjacent channel interference from the femto node is small). Due to limited spectrum available to each operator, however, the use of separate carrier frequencies may not always be practical.

Consequently, a visitor access terminal associated with that other operator may suffer from the coverage hole created by the restricted femto node 108 on that carrier.

Figure 2:
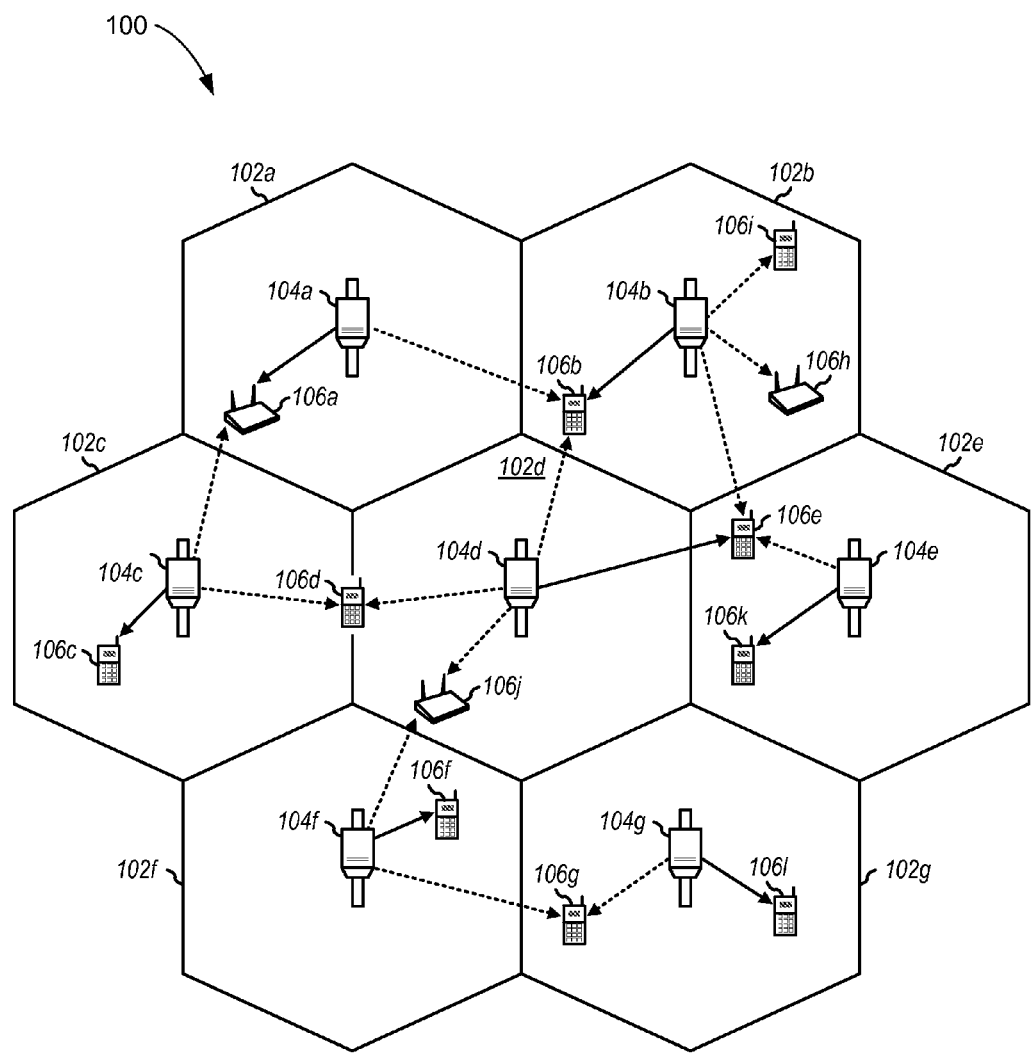
FIG. 2 is another representation of the wireless communication system configured to support a number of users, in which various disclosed embodiments and aspects may be implemented.

FIG. 2 illustrates another representation of the wireless communication system 100 configured to support a number of users, in which various disclosed embodiments and aspects may be implemented. As shown in FIG. 2, by way of example, wireless communication system 100 provides communication for multiple cells 102, such as, for example, macro cells 102A-102G, with each cell being serviced by a corresponding access point (AP) 104 (such as APs 104A-104G). Each cell may be further divided into one or more sectors. Various access terminals (ATs) 106 (e.g., ATs 106A-106K) also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102A-102G may cover a few blocks in a neighborhood.

In various applications, other terminology may be used to reference a macro node 104, a femto node 108, or a pico node. For example, a macro node 104 may be configured or referred to as an access node, base station, access point, eNodeB, macro cell, macro NodeB (MNB), and so on. Also, a femto node 108 may be configured or referred to as a home NodeB (HNB), home eNodeB, access point base station, femto cell, and so on. Also, a cell associated with a macro node, a femto node, or a pico node may be referred to as a macro cell, a femto cell, or a pico cell, respectively.

As mentioned above, a femto node 108 may be restricted in some aspects. For example, a given femto node 108 may only provide service to a limited set of access terminals 106. Thus, in deployments with so-called restricted (or closed) association, a given access terminal 106 may be served by the macro cell mobile network and a limited set of femto nodes 108 (e.g., femto nodes that reside within a corresponding user residence).

The restricted provisioned set of access terminals 106 associated with a restricted femto node 108 (which may also be referred to as a Closed Subscriber Group Home NodeB) may be temporarily or permanently extended as necessary. In some aspects, a Closed Subscriber Group (CSG) may be defined as the set of access nodes (e.g., femto nodes) that share a common access control list of access terminals. In some implementations, all femto nodes (or all restricted femto nodes) in a region may operate on a designated channel, which may be referred to as the femto channel.

Various relationships may be defined between a restricted femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate. A guest femto node may refer to a femto node on which an access terminal is temporarily authorized to access or operate. An alien femto node may refer to a femto node on which the access terminal is not authorized to access or operate, except for perhaps emergency situations (e.g., 911 calls).

From the perspective of a restricted femto node, a home access terminal (or home user equipment, "HUE") may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations such as 911 calls. Thus, in some aspects an alien access terminal may be defined as one that does not have the credentials or permission to register with the restricted femto node. An access terminal that is currently restricted (e.g., denied access) by a restricted femto cell may be referred to herein as a visitor access terminal. A visitor access terminal may thus correspond to an alien access terminal when service is not allowed and a guest access terminal when service is allowed temporarily.

Figure 3:
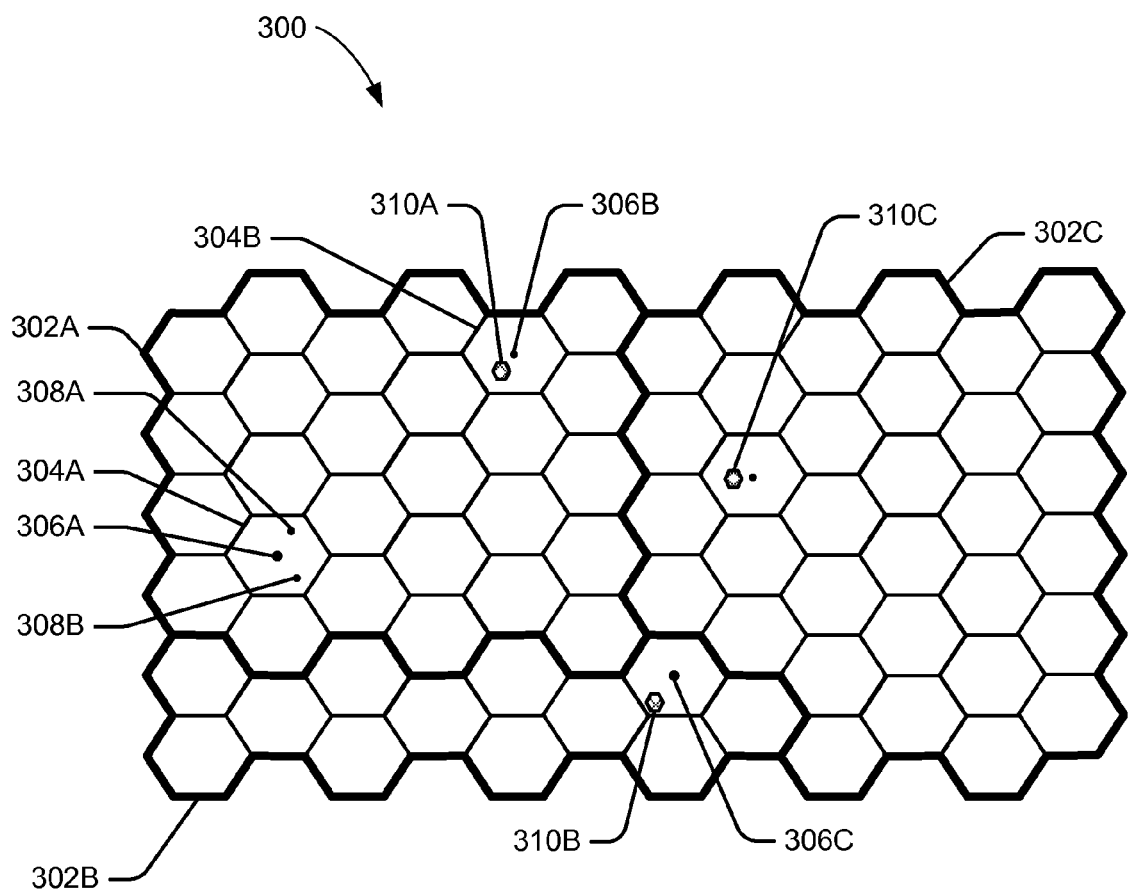
FIG. 3 is a simplified diagram illustrating coverage areas for wireless communication.

FIG. 3 illustrates an example of a coverage map 300 for a network where several tracking areas 302 (or routing areas or location areas) are defined. Specifically, areas of coverage associated with tracking areas 302A, 302B, and 302C are delineated by the wide lines in FIG. 3.

The system provides wireless communication via multiple cells 304 (represented by the hexagons), such as, for example, macro cells 304A and 304B, with each cell being serviced by a corresponding access node 306 (e.g., access nodes 306A-306C). As shown in FIG. 3, access terminals 308 (e.g., access terminals 308A and 308B) may be dispersed at various locations throughout the network at a given point in time. Each access terminal 308 may communicate with one or more access nodes 306 on a forward link (FL) and/or a reverse link (RL) at a given moment, depending upon whether the access terminal 308 is active and whether it is in soft handoff, for example.

The tracking areas 302 also include femto coverage areas 310. In this example, each of the femto coverage areas 310 (e.g., femto coverage area 310A-310C) is depicted within a macro coverage area 304 (e.g., macro coverage area 304B). It should be appreciated, however, that a femto coverage area 310 may not lie entirely within a macro coverage area 304. In practice, a large number of femto coverage areas 310 may be defined with a given tracking area 302 or macro coverage area 304. Also, one or more pico coverage areas (not shown) may be defined within a given tracking area 302 or macro coverage area 304. To reduce the complexity of FIG. 3, only a few access nodes 306, access terminals 308, and femto nodes are shown.

Figure 4:
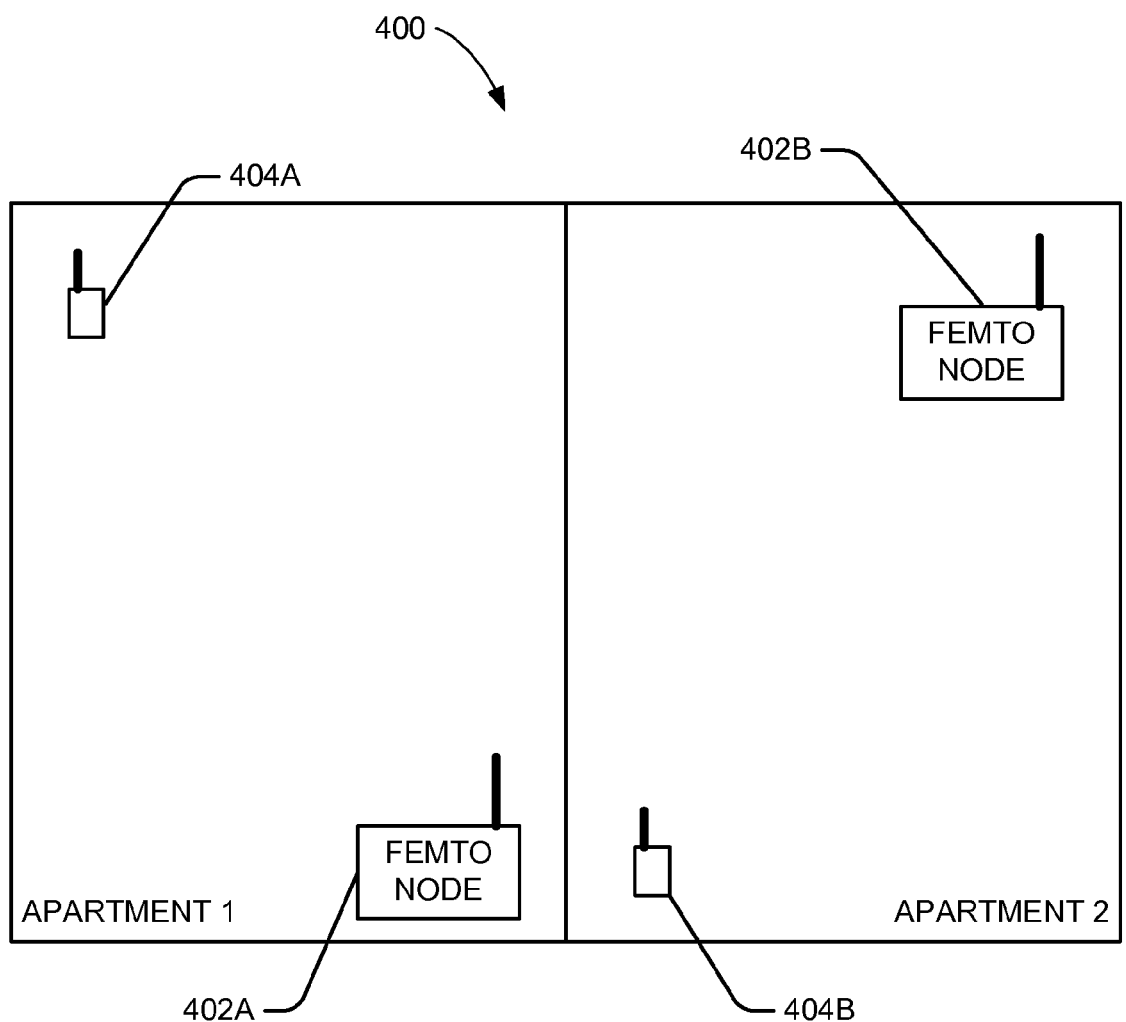
FIG. 4 is a simplified diagram of several sample aspects of a communication system including neighboring femto cells.

FIG. 4 illustrates a network 400 where femto nodes 402 are deployed in an apartment building. Specifically, a femto node 402A is deployed in apartment 1 and a femto node 402B is deployed in apartment 2 in this example. The femto node 402A is the home femto for an access terminal 404A. The femto node 402B is the home femto for an access terminal 404B.

As illustrated in FIG. 4, for the case where the femto nodes 402A and 402B are restricted, each access terminal 404 (e.g., 404A and 404B) may only be served by its associated (e.g., home) femto node 402. In some cases, however, restricted association may result in negative geometry situations and outages of femto nodes. For example, in FIG. 4 the femto node 402A is closer to the access terminal 404B than the femto node 402B and may therefore provide a stronger signal at the access terminal 404B. As a result, the femto node 402A may unduly interfere with reception at the access terminal 404B. Such a situation may thus affect the coverage radius around the femto node 402B at which an associated access terminal 404 may initially acquire the system and remain connected to the system.

Figure 5:
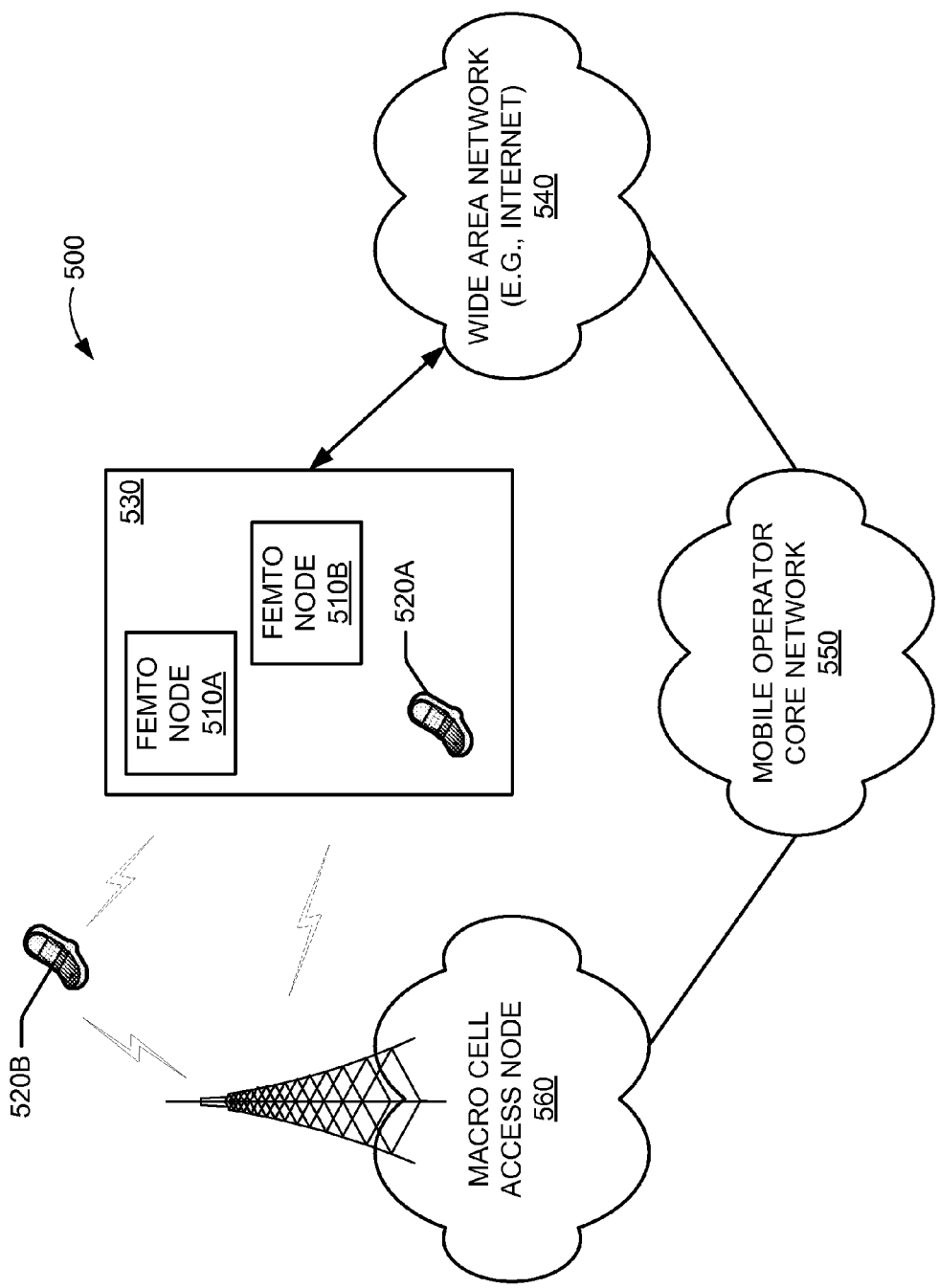
FIG. 5 is a simplified diagram of a wireless communication system including femto nodes.

FIG. 5 illustrates an exemplary communication system 500 where one or more femto nodes are deployed within a network environment. Connectivity for a femto node environment may be established in various ways within this communication system 500. Specifically, the system 500 includes multiple femto nodes 510 (e.g., femto nodes 510A and 510B) installed in a relatively small scale network environment (e.g., in one or more user residences 530). Each femto node 510 may be coupled to a wide area network 540 (e.g., the Internet) and a mobile operator core network 550 via a DSL router, a cable modem, a wireless link, or other connectivity means (not shown). As discussed herein, each femto node 510 may be configured to serve associated access terminals 520 (e.g., access terminal 520A) and, optionally, other access terminals 520 (e.g., access terminal 520B). In other words, access to femto nodes 510 may be restricted whereby a given access terminal 520 may be served by a set of designated (e.g., home) femto nodes 510 but may not be served by any non-designated femto nodes 510 (e.g., a neighbor's femto node 510). Access terminals 520 also may be referred to herein as User Equipment 520 (UEs). Femto nodes 510 also may be referred to herein as Home NodeBs (HNBs).

The owner of a femto node 510 may subscribe to mobile service, such as, for example, 3G mobile service offered through the mobile operator core network 550. In addition, an access terminal 520 may be capable of operating both in macro environments and in smaller scale (e.g., residential) network environments. In other words, depending on the current location of the access terminal 520, the access terminal 520 may be served by an access node 560 of the macro cell mobile network 550 or by any one of a set of femto nodes 510 (e.g., the femto nodes 510A and 510B that reside within a corresponding user residence 530). For example, when a subscriber is outside his home, he may be served by a standard macro access node (e.g., node 560) and when the subscriber is at home, he is served by a femto node (e.g., node 510A). Here, it should be appreciated that a femto node 510 may be backward compatible with existing access terminals 520.

In embodiments described herein, the owner of the femto node 510 subscribes to mobile service, such as, for example, 3G mobile service, offered through the mobile operator core network 550, and the UE 520 is capable to operate both in macro cellular environment and in residential small scale network environment.

A home femto node is a base station on which an AT or UE is authorized to operate. A guest femto node refers to a base station on which an AT or UE is temporarily authorized to operate on, and an alien femto node is a base station on which the AT or UE is not authorized to operate.

A femto node 510 may be deployed on a single frequency or, in the alternative, on multiple frequencies. Depending on the particular configuration, the single frequency or one or more of the multiple frequencies may overlap with one or more frequencies used by a macro node (e.g., node 560).

An access terminal 520 may be configured to communicate either with the macro network 550 or the femto nodes 510, but not both simultaneously. In addition, an access terminal 520 being served by a femto node 510 may not be in a soft handover state with the macro network 550.

In some aspects, an access terminal 520 may be configured to connect to a preferred femto node (e.g., the home femto node of the access terminal 520) whenever such connectivity is possible. For example, whenever the access terminal 520 is within the user's residence 530, it may be desired that the access terminal 520 communicate only with the home femto node 510.

In some aspects, if the access terminal 520 operates within the macro cellular network 550 but is not residing on its most preferred network (e.g., as defined in a preferred roaming list), the access terminal 520 may continue to search for the most preferred network (e.g., the preferred femto node 510) using a Better System Reselection (BSR), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 may select the preferred femto node 510 for camping within its coverage area.

The teachings herein may be employed in a wireless multiple-access communication system that simultaneously supports communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple transmit antennas (NT) and multiple receive antennas (NR) for data communication. A MIMO channel formed by the NT transmit and NR receive antennas may be decomposed into multiple independent channels (NS), which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point. The teachings herein may be incorporated into a node (e.g., a device) employing various components for communicating with at least one other node.

Figure 6:
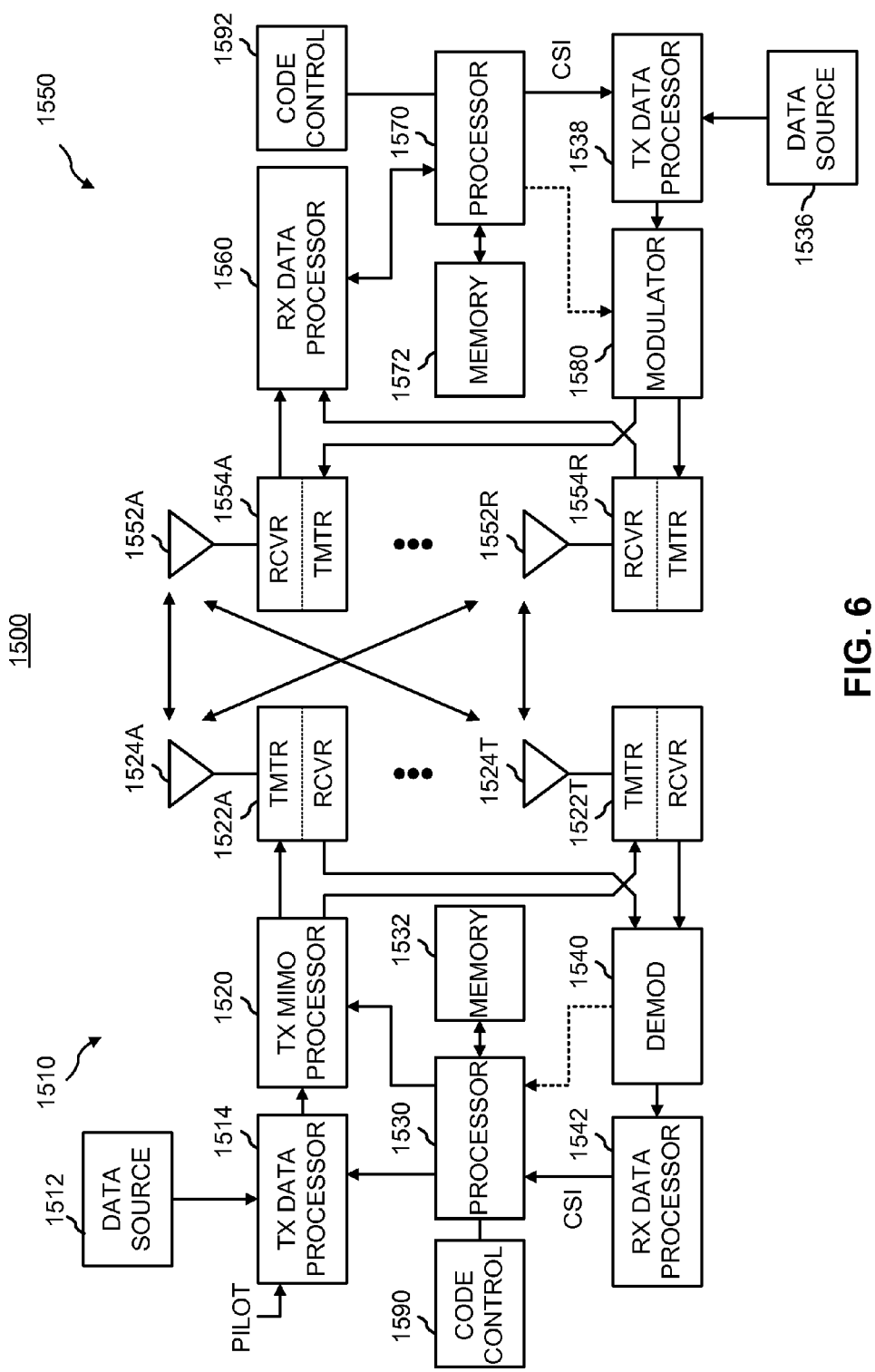
FIG. 6 depicts several sample components that may be employed to facilitate communication between nodes.

FIG. 6 depicts several sample components that may be employed to facilitate communication between nodes. Specifically, FIG. 6 illustrates a wireless device 1510 (e.g., an access point) and a wireless device 1550 (e.g., an access terminal) of a MIMO system 1500. At the access point 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using Orthogonal Frequency-Division Multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme selected for that data stream to provide modulation symbols. As non-limiting examples, some suitable modulation schemes are: Binary Phase-Shift Keying (BPSK), Quadrature Phase-Shift Keying (QSPK), Multiple Phase-Shift Keying (M-PSK), and Multi-level Quadrature amplitude modulation (M-QAM).

The data rate, coding, and modulation for each data stream may be determined by instructions performed by a processor 1530. A data memory 1532 may store program code, data, and other information used by the processor 1530 or other components of the access point 1510.

The modulation symbols for all data streams are then provided to a TX MIMO processor 1520, which may further process the modulation symbols (e.g., for OFDM). The TX MIMO processor 1520 then provides NT modulation symbol streams to NT transceivers (XCVR) 1522 (e.g., 1522A through 1522T). In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1522A through 1522T are then transmitted from corresponding NT antennas 1524 (e.g., 1524A through 1524T).

At the access terminal 1550, the transmitted modulated signals are received by NR antennas 1552 (e.g., 1522A through 1552R) and the received signal from each antenna 1552 is provided to a respective transceiver 1554 (e.g., 1554A through 1554R). Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the NR received symbol streams from NR transceivers 1554 based on a particular receiver processing technique to provide NT "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the access point 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the access terminal 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted through the respective antennas 1522A through 1552R back to the access point 1510.

At the access point 1510, the modulated signals from the access terminal 1550 are received by the antennas 1524, conditioned by the transceivers 1522, demodulated by a demodulator (DEMOD) 1540, and processed by a RX data processor 1542 to extract the reverse link message transmitted by the access terminal 1550. The processor 1530 then determines which pre-coding matrix to use for determining the beam-forming weights then processes the extracted message.

FIG. 6 also illustrates that the communication components may include one or more components that perform downlink code control operations as taught herein. For example, a code control component 1590 may cooperate with the processor 1530 and/or other components of the access point 1510 to send/receive signals to/from another device (e.g., access terminal 1550) as taught herein. Similarly, a code control component 1592 may cooperate with the processor 1570 and/or other components of the access terminal 1550 to send/receive signals to/from another device (e.g., access point 1510). It should be appreciated that for each wireless device 1510 and 1550 the functionality of two or more of the described components may be provided by a single component. For example, a single processing component may provide the functionality of the code control component 1590 and the processor 1530 and a single processing component may provide the functionality of the code control component 1592 and the processor 1570.

An access terminal as discussed herein may be referred to as a mobile station, user equipment, subscriber unit, subscriber station, remote station, remote terminal, user terminal, user agent, or user device. In some implementations such a node may consist of, be implemented within, or include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link. Accordingly, the access node may enable another node (e.g., an access terminal) to access the network or some other functionality. In addition, it should be appreciated that one or both of the nodes may be portable or, in some cases, relatively non-portable. Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
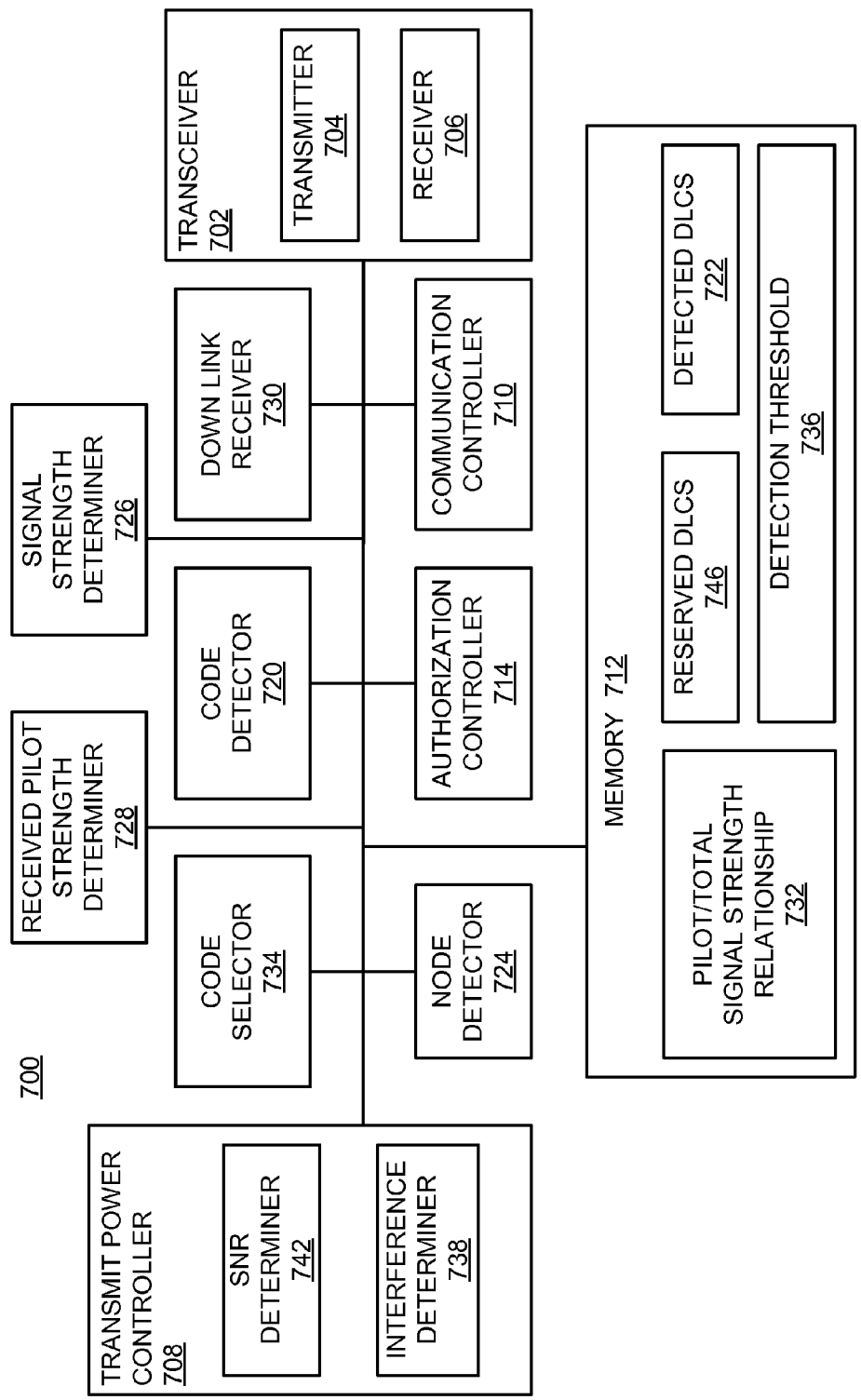
FIG. 7 is a simplified block diagram of several sample aspects of an access node supporting autonomous downlink code selection in femto cells.

FIG. 7 illustrates various components of an access node 700 (also referred to herein as a femto node 700) that may be used in one or more implementations as taught herein. It should thus be appreciated that in some implementations a femto node 700 may not incorporate all of the components depicted in FIG. 7 while in other implementations a femto node 700 may employ most or all of the components depicted in FIG. 7.

Briefly, the femto node 700 includes a transceiver 702 for communicating with other nodes (e.g., access terminals). The transceiver 702 includes a transmitter 704 for sending signals and a receiver 706 for receiving signals.

The femto node 700 may also include a transmit power controller 708 for determining transmit power for the transmitter 704. The femto node 700 includes a communication controller 710 for managing communications with other nodes and for providing other related functionality as taught herein. The femto node 700 also may include an authorization controller 714 for managing access to other nodes and for providing other related functionality as taught herein.

The transmit power controller 708 may include an interference determiner 738 for determining the maximum allowed interference, which may be based on the total received signal strength and the received pilot strength. The transmit power controller 708 also may include a Signal to Noise Ratio (SNR) determiner 742 for determining SNR values associated with the home access terminal. A node detector 724 may determine whether a particular type of node is in a given coverage area. A signal strength determiner 726 may determine a total received signal strength value (e.g., a received signal strength indication, RSSI). A received pilot strength determiner 728 may determine a signal strength value associated with a pilot signal. The memory 712 may store many parameters useful in conjunction with operation of some of the functional elements. For example, the memory 712 may include a pilot/total signal strength relationship 732 corresponding to a known or estimated relationship between the pilot strength and the total strength determined by the signal strength determiner 726 and the received pilot strength determiner 728.

The femto node 700 includes reserved DLCs 746, which may be stored in the memory 712, a downlink (DL) receiver 730, a code detector 720, and a code selector 734. Reserved DLCs 746 (also referred to as femto reserved DLCs) can be retained in the memory 712. According to another illustration, identifiers corresponding to reserved DLCs 746 can be retained in the memory 212. Further, it is to be appreciated that the reserved DLCs 746 can be commonly defined for other neighboring femto nodes and macro nodes.

Figure 8:
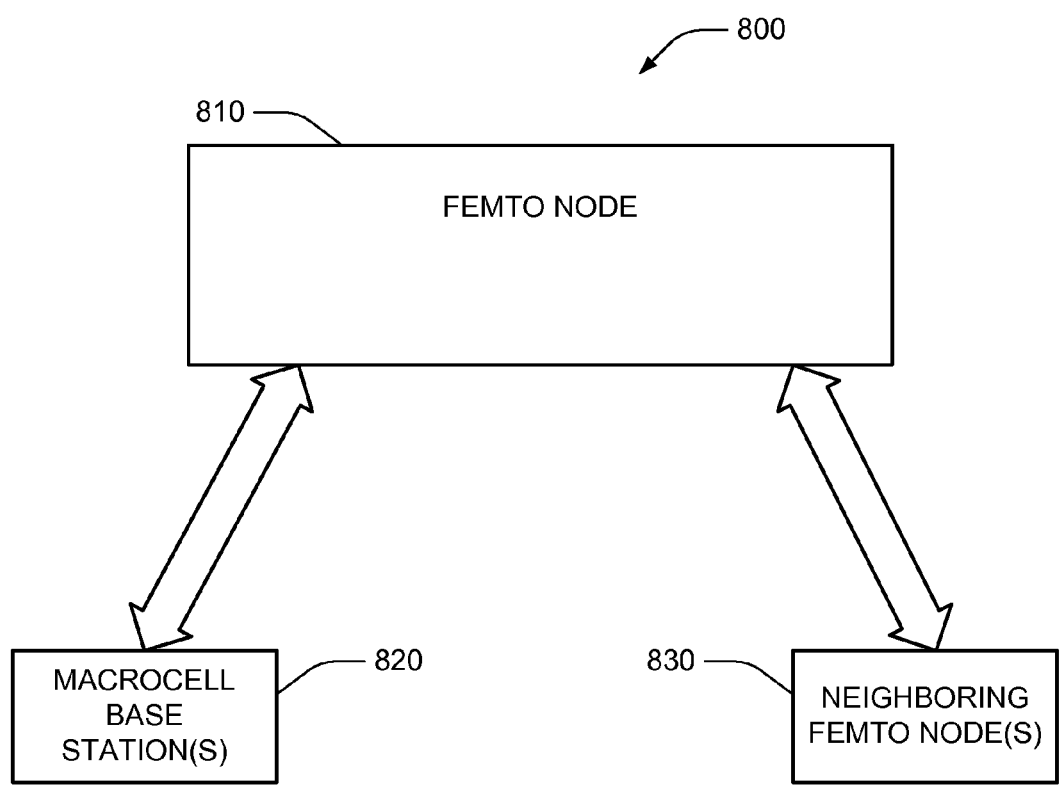
FIG. 8 is a simplified block diagram of a wireless communication system for autonomous downlink code selection in femto cells.

FIG. 8 is a simplified block diagram of a wireless communication system 800 for autonomous downlink code selection in femtocells. The system 800 includes a femtocell 810 (also referred to herein as a HNB, access terminal, femto node, femto access node, and access point base station) and one or more macrocell base stations 820. The system 800 may also include one or more neighboring femto nodes 830. Macrocell base stations 820 and neighboring femto cells 830 may be within geographic proximity of femto node 810.

Each femto node (e.g., femto node 810 and neighboring femto nodes 830) can be configured for a particular pseudo-noise (PN) offset (3GPP2) or DL scrambling code (primary scrambling code or secondary scrambling code in 3GPP) on the downlink.

If the neighboring femto nodes 830 use the same DL codes as the femto node 810, significant problems can arise since Home User Equipments (HUEs) may not be able to associate with the correct femto node (e.g., a mobile may improperly associate with one or more neighboring femto nodes 830 rather than the femto node 810). In addition, decoding performance may be degraded.

In macrocell networks, DL code selection for base stations can be carefully managed through radio frequency (RF) engineering so that base stations near each other in a certain region use different DL codes. However, generally, a user may install a femto cell and connect it to the internet with no professional installer involved. Therefore, RF planning is not practical for femto nodes. In addition, femto nodes may be moved over time, and there may not be as many DL codes available for femto nodes. As a result, an autonomous method for selecting appropriate downlink codes is desired for femto nodes.

Although the following describes femto node 810 (also femto node 700 in FIG. 7), it is to be appreciated that the neighboring femto nodes 830 can be substantially similar thereto. Hence, the neighboring femto nodes 830 can employ an autonomous DL code selection algorithm that is similar to description set forth below.

In reference to both FIGS. 7 and 8, the reserved DLCs 746 can be predefined for use in system 800. However, in many embodiments the reserved DLCs 746 can be adaptively determined over time, such as, for example by downloading them over the internet.

Reserved DLCs 746 include a certain set of DL codes that are reserved for femto nodes. For instance, this set of reserved DLCs 746 for use by femto nodes can be: $DLCs_{FEMTO} = \{DLC_1, \ldots, DLC_N\}$, where N can be substantially any integer.

As a non-limiting example, assume there are 512 DL codes available for a given carrier frequency. If femto nodes operate on a dedicated femto node carrier, then all the available DLCs (e.g., all DLCs corresponding to the dedicated femto node carrier) can be reserved for femto nodes (e.g., N=512). However, if femto nodes operate on a shared carrier with macrocells (e.g., the macrocell base stations 820 share a carrier with the femto node 810 and neighboring femto nodes 830), then a certain subset of available DLCs may be reserved for femto nodes. As a non-limiting example, perhaps six DLCs are reserved for femto nodes. In some embodiments, these codes in the subset are not used by any macrocell base station 820.

The DL receiver 730 and the code detector 720 can effectuate scanning for DLCs that are being utilized by the macrocells 820 and the neighboring femto nodes 830. For example, the DL receiver 730 can obtain downlink transmissions from the macrocells 820 and the neighboring femto nodes 830. Further, the code detector 720, in cooperation with the received pilot strength determiner, can identify the DLCs used by macrocells 820 and neighboring femto nodes 830 that have pilot energy above a detection threshold 736 based upon evaluation of the downlink transmissions obtained using the DL receiver 730.

For example, during a self calibration process, femto nodes may scan for all DL codes and construct a set of DL codes which have pilot energy (also referred to as received pilot strength) above a detection threshold: $DLCs_{DETECTED} = \{DLC_i, DLC_j, \ldots, DLC_k\}$. It is to be appreciated that substantially any number of DLCs can be included in this set of detected DLCs. Further, the detection threshold 736 used by the code detector 720 and stored in memory 712 may be a preset threshold, an adaptively determined threshold, periodically downloaded, and combinations thereof.

The femto node 700 (e.g., the received pilot strength determiner 728) determines the received pilot strength (RSCP) of the neighboring femto cells 830 and macro cells 820. The received pilot strength determiner 728 may determine the received pilot strength in various ways. For example, in some implementations the femto node 700 measures the pilot strength (e.g., the receiver 706 monitors the appropriate channel). In some implementations information relating to the pilot strength may be received from another node (e.g., a home access terminal). This information may take the form of, for example, an actual pilot strength measurement (e.g., from a node that measured the signal strength) or information that may be used to determine a pilot strength value.

In some implementations, the received pilot strength may be estimated from the total received signal strength. This determination may be based on, for example, a known or estimated relationship between the pilot strength and the total strength that is embodied in the form of a pilot/total signal strength relationship 732 (e.g., a function, a table, or a graph) stored in the memory 712. In such an implementation, the signal strength determiner 726 may comprise the received pilot signal strength determiner 728.

Thus, the femto node 700 (e.g., the signal strength determiner 726) determines the total received signal strength (RSSI) on the neighboring femto cells 830 and macro cells 820. The signal strength determiner 726 may determine the signal strength in various ways. For example, in some implementations the femto node 700 measures the signal strength (e.g., the receiver 706 monitors the appropriate channel). In some implementations information relating to the signal strength may be received from another node (e.g., a home access terminal). This information may take the form of, for example, an actual signal strength measurement (e.g., from a node that measured the signal strength) or information that may be used to determine a signal strength value. With the RSSI determined, the pilot energy for all the nodes can be estimated based on the RSSIs and the pilot/total signal strength relationship 732.

It is contemplated that femto nodes have DL receiver functionality similar to mobile terminals. Further, enhanced pilot detection performance can be achieved for femto nodes compared to typical mobile terminal requirement since longer integration times can be used for femto node searchers using the DL receiver 730 in combination with the code detector 720.

The code detector 720 can yield the set $DLCs_{DETECTED}$ and store them in the memory 712 as detected DLCs 722. In some cases not all of the DLCs being used may be detected. For example, a neighbor may be using a particular DLC but the femto node 700 may not detect it because the received signal energy is too low. There is also a set $DLCs_{FEMTO}$ that encompasses the DLCs used by a femto node, reserved for femto nodes, or a combination thereof. This combination of DLCs reserved for femto nodes may be stored in the memory 712 as the reserved DLCs 746. Note that some of the DLCs in the set $DLCs_{DETECTED}$ can be part of the set $DLCs_{FEMTO}$. In other words, DLCs used by neighboring femto nodes 830 may have been detected by the code detector 720. The rest of the DLCs in the set $DLCs_{DETECTED}$ can be part of "macrocell only" DLCs (e.g., DLCs used by macrocell base stations 820, and DLCs excluded from the reserved DLCs 746.

Further, the code selector 734 may choose an optimal DLC for use by HNB 810. Thus, a femto node can select a "best" DLC as follows: a) if all femto reserved DLCs 746 are being used by neighboring femto nodes 830, then they should be in the detected set. In that case, the femto node 700 picks a DLC in the reserved set of femto DLCs with a smallest amount of detected energy. b) Otherwise, the femto node picks a DLC randomly from the set of DLCs in the reserved set of DLCs but not in the detected set.

Hence, describing the code selection process in pseudo-code, the code selector 734 can effectuate the following (e.g., a femto node can select a "best" DLC per the following):

If
$DLCs_{FEMTO} \subset DLCs_{DETECTED}$ (e.g., all femto reserved DLCs 746 are being used by neighbor femto nodes)
Then
The femto node picks a DLC in $DLCs_{FEMTO}$ with a smallest amount of detected energy (e.g., $Ecp\_DLC_{SELECTED} \leq Ecp\_DLCx$ where x=1, ..., N)
Else
The femto node picks a DLC randomly from the set of DLCs that is a member of $DLCs_{FEMTO}$ but not a member of $DLCs_{DETECTED}$
(e.g., $DLC_{SELECTED} \in (DLCs_{FEMTO} - DLCs_{DETECTED})$)

Figure 9:
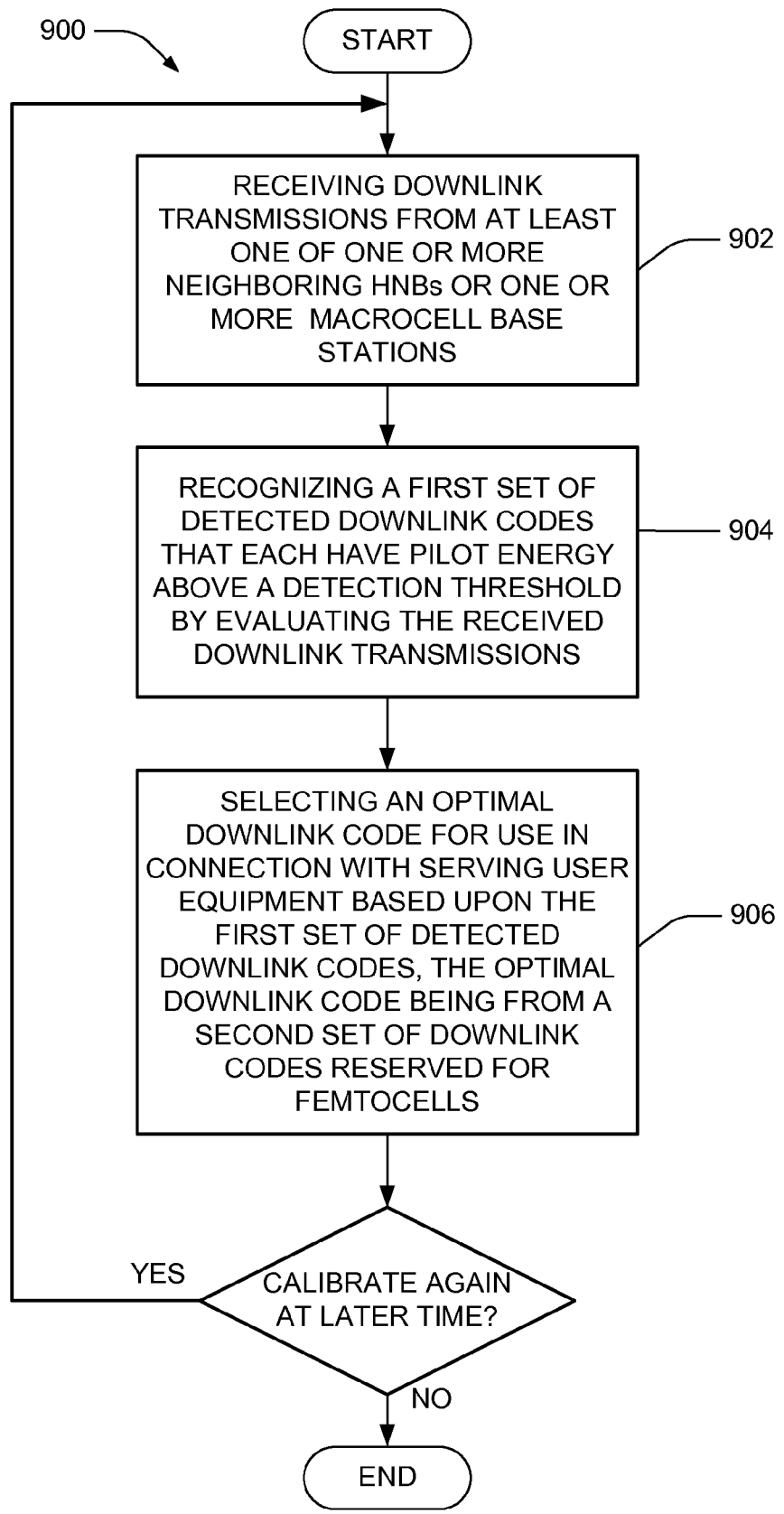
FIG. 9 is a simplified flow diagram of a downlink code selection process.

Referring to FIG. 9, a methodology relating to autonomous DL code selection in a wireless communication environment is illustrated. While, for purposes of simplicity of explanation, the methodology is shown and described as a series of acts, it is to be understood and appreciated that the methodology is not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 9, illustrated is a methodology 900 that facilitates choosing downlink codes for femto nodes in a wireless communication environment. At block 902, downlink transmissions from at least one of one or more neighboring Home Node Bs (HNBs) and one or more macrocell base stations can be received.

At block 904, a first set of detected downlink codes (i.e., $DLCs_{DETECTED}$) that each have pilot energy above a detection threshold can be recognized by evaluating the received downlink transmissions. For example, better pilot detection performance can be achieved for femto nodes as compared to typical user equipment requirements since longer integration times can be used. Further, a subset of the first set of detected downlink codes can be included in a second set of downlink codes (i.e., $DLCs_{FEMTO}$) reserved for femto nodes (e.g., downlink codes in this subset can be determined to be used by neighboring femto nodes), while a remainder of the first set of detected downlink codes can be included in a subset of downlink codes associated with macrocells (i.e., $DLCs_{MACRO}$). By way of further example, the detection threshold can be preset, adaptively determined, or the like.

At block 906, an optimal downlink code for use in connection with serving user equipment can be selected based upon the first set of detected downlink codes ($DLCs_{DETECTED}$), where the optimal downlink code can be from the second set of downlink codes reserved for femto nodes ($DLCs_{FEMTO}$) For instance, the selection of the optimal downlink code can be effectuated autonomously as part of self calibration. Further, the optimal downlink code can be a downlink code with a smallest amount of detected energy when all downlink codes reserved for femto nodes from the second set are being used by neighboring femto nodes (i.e., all the $DLCs_{FEMTO}$ codes are included in the $DLCs_{DETECTED}$ codes). Moreover, the optimal downlink code can be randomly selected from one or more downlink codes reserved for femto nodes from the second set ($DLCs_{FEMTO}$) that are not members of the first set of detected downlink codes ($DLCs_{DETECTED}$) when one or more downlink codes reserved for femto nodes from the second set are not included in the first set of detected downlink codes.

This process 900 may be repeated periodically. As a non-limiting example, and referring to FIG. 8, a new neighboring femto cells 830 may enter the wireless communication system 800 and interfere with the currently selected DL code for the femto cell 810. A periodic recalibration may allow the femto cell 810 to select a new DL code. This recalibration may be performed on demand or at a regularly scheduled time of anticipated low traffic, such as, for example, in the early morning hours.

Figure 10:
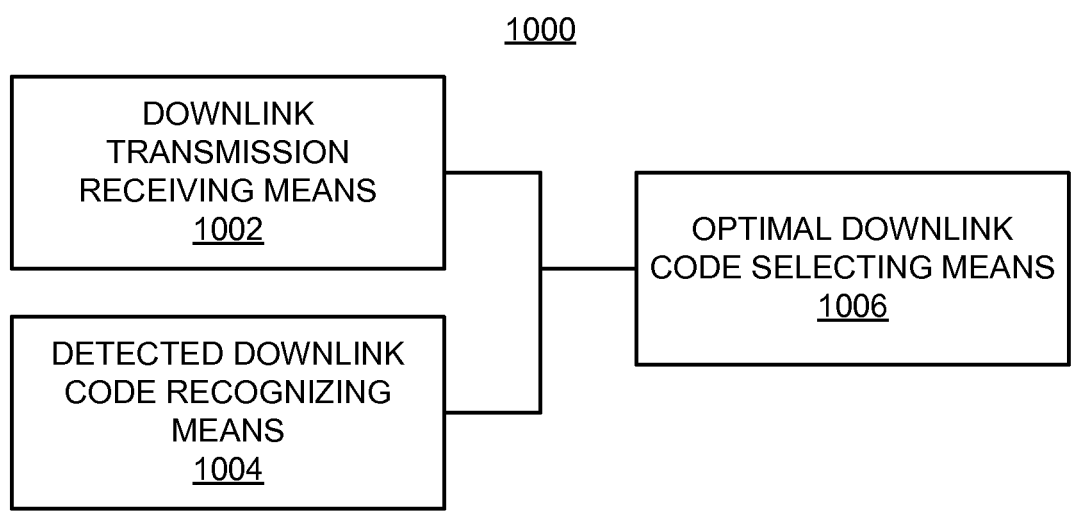
FIG. 10 is a simplified block diagram of several sample aspects of apparatuses configured for autonomously selecting a downlink code for a femto node as taught herein.

The components described herein may be implemented in a variety of ways. Referring to FIG. 10, apparatus 1000 is represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatus 1000 may include one or more modules that may perform one or more of the functions described above with regard to various figures. For example, a downlink transmission receiving means 1002 may correspond to, for example, a downlink receiver as discussed herein. A detected downlink code recognizing means 1004 may correspond to, for example, a code detector as discussed herein. An optimal downlink code selecting means 1006 may correspond to, for example, a code selector as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for choosing downlink codes for femto nodes in a wireless communication environment, comprising:
    receiving downlink transmissions from at least one of one or more neighboring femto nodes and one or more macrocell base stations;
    evaluating the downlink transmissions to recognize a first set of detected downlink codes that each have a pilot energy above a detection threshold;
    determining a second set of downlink codes reserved for the femto nodes; and
    selecting an optimal downlink code from the second set of downlink codes for a femto node to use in connection with serving user equipment responsive to a correlation between the first set of detected downlink codes and the second set of downlink codes, wherein selecting the optimal downlink code comprises selecting a downlink code with a smallest amount of detected energy when the correlation indicates that all the downlink codes of the second set of downlink codes are included in the first set of detected downlink codes.

2. The method of claim 1, wherein a subset of the first set of detected downlink codes is included in the second set of downlink codes and a remainder of the first set of detected downlink codes is included in a third set of downlink codes associated with macrocells.

3. The method of claim 1, wherein the detection threshold is one of a preset threshold or an adaptively determined threshold.

4. The method of claim 1, further comprising selecting the optimal downlink code autonomously as part of self calibration.

5. The method of claim 1, wherein selecting the optimal downlink code further comprises randomly selecting a downlink code from the second set of downlink codes that are not members of the first set of detected downlink codes when the correlation indicates that one or more members of the second set of downlink codes are not members of the first set of detected downlink codes.

6. The method of claim 1, wherein the acts of receiving downlink transmissions, evaluating the downlink transmissions, and selecting the optimal downlink code are periodically repeated.

7. A wireless communications apparatus, comprising:
    a downlink receiver for receiving downlink transmissions from at least one of one or more neighboring femto nodes and one or more macrocell base stations;
    a code detector for recognizing a first set of detected downlink codes that each have a pilot energy above a detection threshold by evaluating the downlink transmissions; and
    a code selector for selecting an optimal downlink code for a femto node to use in connection with serving user equipment based upon the first set of detected downlink codes wherein the optimal downlink code is from a second set of downlink codes reserved for femto nodes, wherein the code selector is further for selecting a downlink code with a smallest amount of detected energy as the optimal downlink code when all of the second set of downlink codes are included in the first set of detected downlink codes.

8. The apparatus of claim 7, wherein a subset of the first set of detected downlink codes is included in the second set of downlink codes and a remainder of the first set of detected downlink codes is included in a third set of downlink codes associated with macrocells.

9. The apparatus of claim 7, wherein the detection threshold is one of a preset threshold or an adaptively determined threshold.

10. The apparatus of claim 7, wherein the code selector is further for selecting the optimal downlink code autonomously as part of a self calibration.

11. The apparatus of claim 7, wherein the code selector is further for randomly selecting a downlink code from one or more downlink codes of the second set of downlink codes that are not members of the first set of detected downlink codes as the optimal downlink code.

12. A wireless communications apparatus, comprising:
    means for receiving downlink transmissions from at least one of one or more neighboring femto nodes and one or more macrocell base stations;
    means for recognizing a first set of detected downlink codes that each have a pilot energy above a detection threshold by evaluating the downlink transmissions; and
    means for selecting an optimal downlink code for a femto node to use in connection with serving user equipment based upon the first set of detected downlink codes, the optimal downlink code being from a second set of downlink codes reserved for femto nodes, wherein the means for selecting the optimal downlink code comprises means for selecting a downlink code with a smallest amount of detected energy when all the downlink codes of the second set of downlink codes are included in the first set of detected downlink codes.

13. The apparatus of claim 12, wherein a subset of the first set of detected downlink codes is included in the second set of downlink codes and a remainder of the first set of detected downlink codes is included in a third set of downlink codes associated with macrocells.

14. The apparatus of claim 12, wherein the detection threshold is one of a preset threshold or an adaptively determined threshold.

15. The apparatus of claim 12, further comprising means for selecting the optimal downlink code autonomously as part of self calibration.

16. The apparatus of claim 12, wherein the means for selecting the optimal downlink code further comprises means for randomly selecting a downlink code from one or more downlink codes of the second set of downlink codes that are not members of the first set of detected downlink codes.

17. A non-transitory computer-readable medium comprising codes for causing a computer to:
    receive downlink transmissions from at least one of one or more neighboring Home femto nodes and one or more macrocell base stations;
    evaluate the downlink transmissions to recognize a first set of detected downlink codes that each have a pilot energy above a detection threshold; and
    select an optimal downlink code for a femto node to use in connection with serving user equipment based upon the first set of detected downlink codes, the optimal downlink code being from a second set of downlink codes reserved for femto nodes, wherein selecting the optimal downlink code comprises selecting a downlink code with a smallest amount of detected energy as the optimal downlink code when all of the second set of downlink codes are included in the first set of detected downlink codes.

18. The non-transitory computer-readable medium of claim 17, wherein a subset of the first set of detected downlink codes is included in the second set of downlink codes and a remainder of the first set of detected downlink codes is included in a third set of downlink codes associated with macrocells.

19. The non-transitory computer-readable medium of claim 17, further comprising codes for causing the computer to randomly select a downlink code from one or more downlink codes of the second set of downlink codes that are not members of the first set of detected downlink codes as the optimal downlink code.

20. In a wireless communications system, an apparatus comprising:
 a memory; and
 a processor operably coupled to the memory and configured for:
  receiving downlink transmissions from at least one of one or more neighboring femto nodes and one or more macrocell base stations;
  evaluating the downlink transmissions to recognize a first set of detected downlink codes that each have a pilot energy above a detection threshold; and
  selecting an optimal downlink code for a femto node to use in connection with serving user equipment based upon the first set of detected downlink codes, the optimal downlink code being from a second set of downlink codes reserved for femto nodes, wherein selecting the optimal downlink code comprises selecting a downlink code with a smallest amount of detected energy when all the downlink codes of the second set of downlink codes are included in the first set of detected downlink codes.

21. The apparatus of claim 20, wherein a subset of the first set of detected downlink codes is included in the second set of downlink codes and a remainder of the first set of detected downlink codes is included in a third set of downlink codes associated with macrocells.

22. The apparatus of claim 20, wherein selecting the optimal downlink code further comprises randomly selecting a downlink code from one or more downlink codes of the second set of downlink codes that are not members of the first set of detected downlink codes.

23. The method of claim 1, wherein the receiving, evaluating, determining, and selecting are performed by the femto node for which the optimal downlink code is selected.

24. The method of claim 1, wherein each downlink code corresponds to one of a plurality of primary or secondary scrambling codes associated with a given carrier frequency.

25. The method of claim 1, further comprising selecting a carrier frequency for the femto node to use in connection with serving the user equipment prior to selecting the optimal downlink code, the optimal downlink code being one of a plurality of downlink codes associated with the selected carrier frequency.

* * * * *